(12) United States Patent
Lin

(10) Patent No.: US 11,500,964 B2
(45) Date of Patent: Nov. 15, 2022

(54) DEVICE FOR COMPUTING THE INNER PRODUCT OF VECTORS

(71) Applicant: National Chung Cheng University, Chia-Yi (TW)

(72) Inventor: Tay-Jyi Lin, Chia-Yi (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 128 days.

(21) Appl. No.: 17/076,548

(22) Filed: Oct. 21, 2020

(65) Prior Publication Data

US 2022/0067120 A1 Mar. 3, 2022

(30) Foreign Application Priority Data

Aug. 28, 2020 (TW) ................................. 109129650

(51) Int. Cl.
| | | |
|---|---|---|
| *G06F 17/16* | (2006.01) | |
| *G06F 7/527* | (2006.01) | |
| *G06F 5/01* | (2006.01) | |
| *G06F 7/544* | (2006.01) | |
| *G06F 7/50* | (2006.01) | |

(52) U.S. Cl.
CPC ................ *G06F 17/16* (2013.01); *G06F 5/01* (2013.01); *G06F 7/50* (2013.01); *G06F 7/5275* (2013.01); *G06F 7/5443* (2013.01)

(58) Field of Classification Search
CPC .......... G06F 17/16; G06F 7/50; G06F 7/5275; G06F 7/5443; G06F 15/7821; G06F 15/785; G06F 5/01; G06G 7/16
See application file for complete search history.

(56) References Cited

U.S. PATENT DOCUMENTS

| | | | |
|---|---|---|---|
| 10,216,703 B2* | 2/2019 | Gupta | G06F 17/16 |
| 10,311,126 B2* | 6/2019 | Le Gallo | G06F 17/16 |
| 10,496,855 B2* | 12/2019 | Muralimanohar | G06G 7/14 |
| 2019/0034201 A1* | 1/2019 | Muralimanohar | G06F 9/30036 |
| 2021/0303265 A1* | 9/2021 | Yudanov | G06F 7/5443 |
| 2021/0397932 A1* | 12/2021 | Yudanov | G06N 3/063 |

* cited by examiner

*Primary Examiner* — Matthew D Sandifer
*Assistant Examiner* — Huy Duong
(74) *Attorney, Agent, or Firm* — Muncy, Geissler, Olds & Lowe, P.C.

(57) ABSTRACT

A device for computing the inner product of vectors includes a vector data arranger, a vector data pre-accumulator, a number converter, and a post-accumulator. The vector data arranger stores a first vector and sequentially outputs a plurality of vector data based on the first vector. The vector data pre-accumulator stores a second vector, receives each of the vector data, and pre-accumulates the second vector, so as to generate a plurality accumulation results. The number converter and the post-accumulator receive and process all the accumulation results corresponding to each of the vector data to generate an inner product value. The present invention implements a lookup table with the vector data pre-accumulator and the number converter to increase calculation speed and reduce power consumption.

15 Claims, 3 Drawing Sheets

DEVICE FOR COMPUTING THE INNER PRODUCT OF VECTORS

This application claims priority of Application No. 109129650 filed in Taiwan on 28 Aug. 2020 under 35 U.S.C. § 119; the entire contents of all of which are hereby incorporated by reference.

BACKGROUND OF THE INVENTION

Field of the Invention

The present invention relates to a computing device, particularly to a device for computing the inner product of vectors.

Description of the Related Art

Distributed arithmetic is used for designing a signal processing hardware architecture that replaces the multiply-accumulation (MAC) for computing the inner product of vectors with a look-up table memory. However, the size of the look-up table memory will increase exponentially with the length of the vector. Thus, the look-up table memory is only suitable for computing an inner product of short vectors.

Formula (1) represents that the inner product of vectors x and h is computed. The length of each of the vectors x and h is K. The word length of each of the vectors x and h is N bits. The vector x includes first sub-vectors. $x_i$ represents the i-th first sub-vectors. The vector h includes second sub-vectors. $h_i$ represents the i-th second sub-vectors. K multiplication operations with N bits are performed to obtain multiple products and (K−1) addition operations are performed on the multiple products to obtain an inner product value y of the vectors x and h. In other words, the inner product value y needs K MAC operations to be obtained. Assume that x is an unsigned number. The sub-vector $x_i$ is represented with $x_{i,j} \cdot 2^j$, wherein j is the power. Since the vector h is extraneous to j, the positions of two accumulation operations are exchanged to derive the last equation of formula (1). This is the basic principle of distributed arithmetic. The inner product of the N-bit vector h and a vector $x_{i,j}$ is represented in a bracket, wherein the vector $x_{i,j}$ is represented with $[x_{0,j}, x_{1,j}, \ldots, x_{K-1,j}]$. $2^K$ results are calculated by the real value of the vector $x_{i,j}$ with a length of K. The $2^K$ results are stored in a memory with $2^K$ entries. The calculation in the bracket is directly completed by looking up the memory. The calculation outside the bracket is equivalent to a shift-accumulation operation performed by a serial multiplier. FIG. 1 is a diagram schematically illustrating a conventional hardware architecture using distributed arithmetic. The hardware architecture includes a data generator 10 based on shift registers. The data generator 10 converts the sub-vectors $x_i$ into the bit-level vector $x_{i,j}$ and sequentially looks up $2^K$ entries in a look-up table memory 12. Take Table 1 as an example. When the vector $x_{i,j}$ is [000 . . . 0], the corresponding entry in the look-up table memory 12 is 0. When the vector $x_{i,j}$ is [000 . . . 1], the corresponding entry in the look-up table memory 12 is $h_1$. When the vector $x_{i,j}$ is [111 . . . 1], the corresponding entry in the look-up table memory 12 is the sum of all $h_i$. The entries are looked up N times in the look-up table memory 12 and a shift accumulator 14 performs operations N times, such that the inner product value y is obtained. The look-up table memory 12 is a key component in the distributed arithmetic architecture. The size of the look-up table memory 12 increases exponentially with the length of the vector. In the conventional technology, computing an inner product of long vectors needs to look up entries in the look-up table several times. However, the method loses the original advantages of distributed arithmetic.

$$y = \sum_{i=0}^{K-1} h_i \cdot x_i = \sum_{i=0}^{K-1} h_i \cdot \left(\sum_{j=0}^{N-1} x_{i,j} \cdot 2^j\right) = \sum_{j=0}^{N-1} \left(\sum_{i=0}^{K-1} h_i \cdot x_{i,j}\right) \cdot 2^j \quad (1)$$

TABLE 1

| $X_{L-1,j}$ | ... | $X_{2,j}$ | $X_{1,j}$ | $X_{0,j}$ | $\sum_{i=0}^{K-1} h_i \cdot x_{i,j}$ |
|---|---|---|---|---|---|
| 0 | ... | 0 | 0 | 0 | 0 |
| 0 | ... | 0 | 0 | 1 | $h_0$ |
| 0 | ... | 0 | 1 | 0 | $h_1$ |
| 0 | ... | 0 | 1 | 1 | $h_0 + h_1$ |
| . |   | . | . | . | . |
| . |   | . | . | . | . |
| . |   | . | . | . | . |

To overcome the abovementioned problems, the present invention provides a device for computing the inner product of vectors, so as to solve the afore-mentioned problems of the prior art.

SUMMARY OF THE INVENTION

The present invention provides a device for computing the inner product of vectors, which applies to computing an inner product of long vectors, greatly reduces computation amount, increases computation speed, and decreases power consumption.

In an embodiment of the present invention, a device for computing the inner product of vectors is provided. The device for computing the inner product of vectors includes a vector data arranger, a vector data pre-accumulator, a number converter, and a post-accumulator. The vector data arranger is configured to store a first vector for computing the inner product of vectors. The first vector includes sub-vectors. The vector data arranger is configured to sequentially output a plurality of vector data. Each of the plurality of vector data includes at least one identical bit of each of the sub-vectors. The vector data pre-accumulator includes word lines that are arranged in parallel and coupled to the vector data arranger. The vector data pre-accumulator is configured to store a second vector for computing the inner product of vectors. The word lines are configured to receive each of the plurality of vector data. Each of the plurality of vector data enables the word line. The enabled word line pre-accumulates the second vector to generate accumulation results. The number converter is coupled to the vector data pre-accumulator and configured to receive, shift and add the accumulation results corresponding to each of the plurality of vector data to obtain a total data value in number format. The post-accumulator is coupled to the number converter and configured to receive, shift, and accumulate the total data values corresponding to the plurality of vector data, thereby generating an inner product value.

In an embodiment of the present invention, the vector data pre-accumulator further comprises memory cells and bit lines arranged in parallel. The second vector includes data word vectors. Each of the word lines is coupled to the bit lines through the memory cell. The memory cells respectively corresponding to the word lines are respectively configured to store the data word vectors. The vector data pre-accumulator is configured to accumulate the data word vectors corresponding to the bit lines corresponding to the enabled word line, thereby generating the accumulation results respectively corresponding to the bit lines.

In an embodiment of the present invention, the number converter is a redundant to 2's complement (RTC) converter and the number format is 2's complement format.

In an embodiment of the present invention, the post-accumulator is configured to shift and accumulate the total data values corresponding to the plurality of vector data based on an equation of $P=\Sigma_{j=0}^{N-1} T_j \cdot 2^j$, thereby generating the inner product value. P represents the inner product value. N represents total number of the plurality of vector data. $T_j$ represents the total data value corresponding to a j-th vector datum of the plurality of vector data.

In an embodiment of the present invention, the vector data pre-accumulator is a computing-in-memory architecture.

In an embodiment of the present invention, the data word vectors include logic "1" or logic "0".

In an embodiment of the present invention, each of the accumulation results generated by the vector data pre-accumulator is the total number of the corresponding logic "1".

In an embodiment of the present invention, the number converter and the post-accumulator are integrated into a carry-save adder.

In an embodiment of the present invention, a device for computing the inner product of vectors is provided. The device for computing the inner product of vectors includes a vector data arranger, a vector data pre-accumulator, a post-accumulator, and a number converter. The vector data arranger is configured to store a first vector for computing the inner product of vectors. The first vector includes sub-vectors. The vector data arranger is configured to sequentially output a plurality of vector data. Each of the plurality of vector data includes at least one identical bit of each of the sub-vectors. The vector data pre-accumulator includes word lines that are arranged in parallel and coupled to the vector data arranger. The vector data pre-accumulator is configured to store a second vector for computing the inner product of vectors. The word lines are configured to receive each of the plurality of vector data. Each of the plurality of vector data enables the word line. The enabled word line pre-accumulates the second vector to generate accumulation results. The post-accumulator is coupled to the vector data pre-accumulator and configured to receive, shift, and accumulate the accumulation results corresponding to the plurality of vector data, thereby obtaining accumulation data values in redundant format. The number converter is coupled to the post-accumulator and configured to receive, shift, and add the accumulation data values, thereby obtaining an inner product value in number format.

In an embodiment of the present invention, the vector data pre-accumulator further comprises memory cells and bit lines arranged in parallel. The second vector includes data word vectors. Each of the word lines is coupled to the bit lines through the memory cell. The memory cells respectively corresponding to the word lines are respectively configured to store the data word vectors. The vector data pre-accumulator is configured to accumulate the data word vectors corresponding to the bit lines corresponding to an enabled word line, thereby generating the accumulation results respectively corresponding to the bit lines.

In an embodiment of the present invention, the number converter is a redundant to 2's complement (RTC) converter and the number format is 2's complement format.

In an embodiment of the present invention, the number converter is configured to shift and add the accumulation data values based on an equation of $P=\Sigma_{j=0}^{N+M-2} AD_j \cdot 2^j$, thereby generating the inner product value. P represents the inner product value. N represents total number of the plurality of vector data. $AD_j$ represents a j-th accumulation data value of the accumulation data values in redundant format. M represents total number of the accumulation results corresponding to each of the plurality of vector data.

In an embodiment of the present invention, the vector data pre-accumulator is a computing-in-memory architecture.

In an embodiment of the present invention, the data word vectors include logic "1" or logic "0".

In an embodiment of the present invention, each of the accumulation results generated by the vector data pre-accumulator is the total number of the corresponding logic "1".

In an embodiment of the present invention, the number converter and the post-accumulator are integrated into a carry-save adder.

To sum up, the embodiments of the device for computing the inner product of vectors sense word lines and bit lines and implement a look-up table memory with the vector data pre-accumulator and the number converter. The memory size of the vector data pre-accumulator linearly increase with the length of the vector. Thus, the device for computing the inner product of vectors applies to computing an inner product of long vectors, greatly reduces computation amount, increases computation speed, and decreases power consumption.

Below, the embodiments are described in detail in cooperation with the drawings to make easily understood the technical contents, characteristics and accomplishments of the present invention.

DETAILED DESCRIPTION OF THE INVENTION

Figure 1:
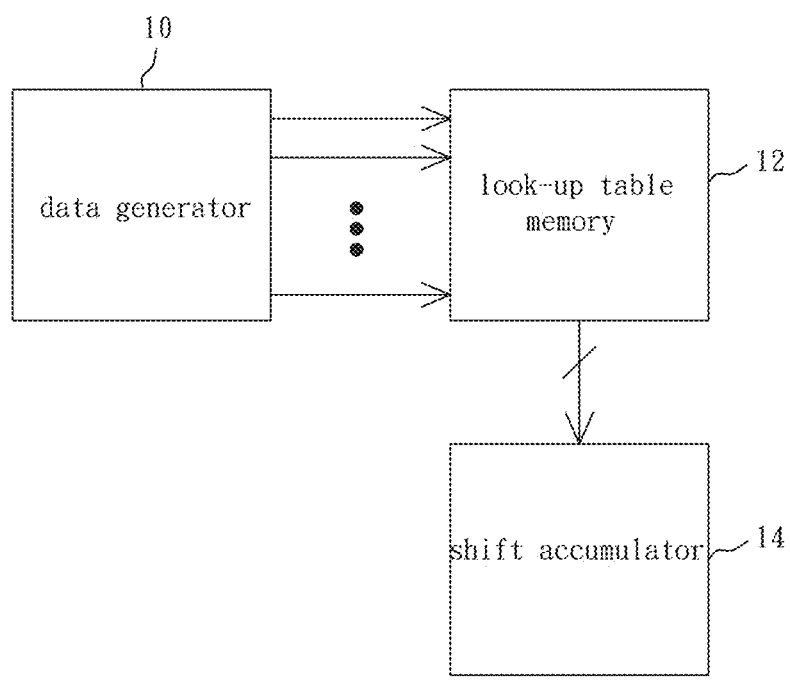
FIG. 1 is a schematic diagram illustrating a conventional hardware architecture using distributed arithmetic.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Figure 2:
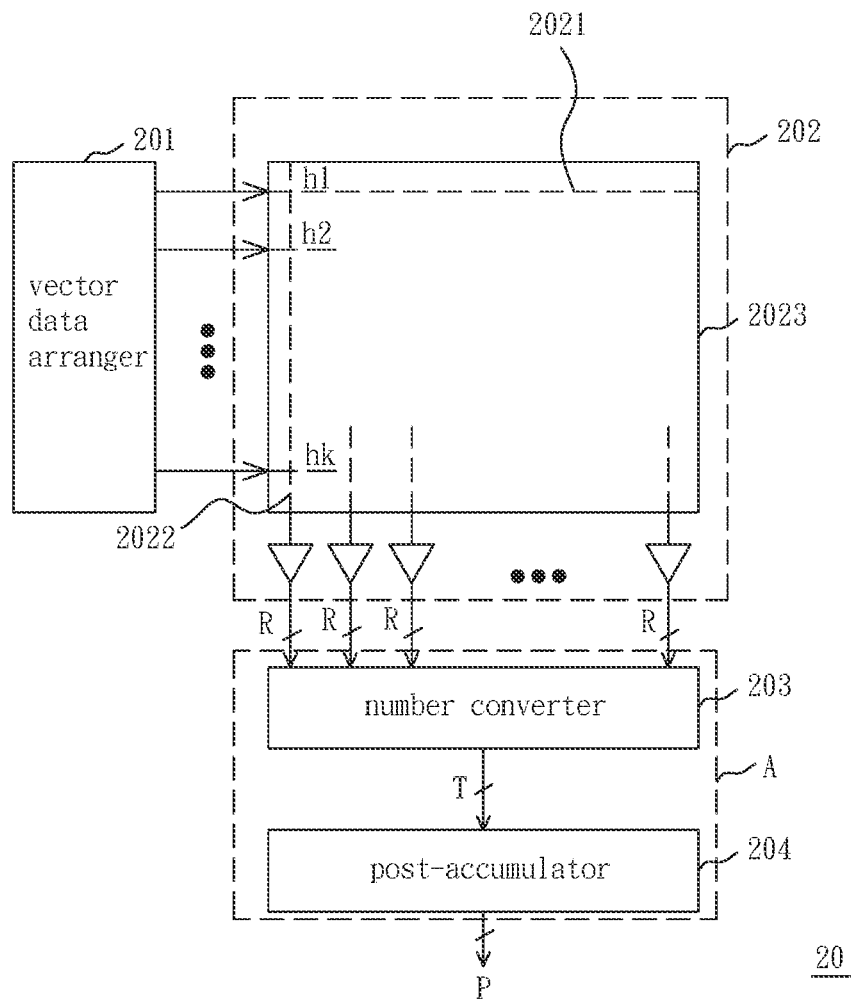
FIG. 2 is a schematic diagram illustrating a device for computing the inner product of vectors according to a first embodiment of the present invention.

FIG. 2 is a schematic diagram illustrating a device for computing the inner product of vectors according to a first embodiment of the present invention. Referring to FIG. 2, the first embodiment of the device for computing the inner product of vectors of the present invention is introduced as follows. The device 20 for computing the inner product of vectors includes a vector data arranger 201, a vector data pre-accumulator 202, a number converter 203, and a post-accumulator 204. The vector data arranger 201 is configured to store a first vector for computing the inner product of vectors. The first vector includes sub-vectors. The total number of the sub-vectors is K. Each sub-vector has N bits. The vector data arranger 201 is configured to sequentially output a plurality of vector data, wherein each of the plurality of vector data includes at least one identical bit or one identical byte of each of the sub-vectors. For example, the first vector includes three sub-vectors. Each sub-vector includes three bits or three bytes. The vector data arranger 201 is configured to sequentially output three vector data. Assume that the first sub-vector, the second sub-vector, and the third sub-vector are respectively [000], [010], and [100]. The first vector datum includes the first bit of each sub-vector, namely [000]. The second vector datum includes the second bit of each sub-vector, namely [010]. The third vector datum includes the third bit of each sub-vector, namely [001]. In the first embodiment, the total number of the vector data is N/B. B is the bit-width for selecting the same bit data of each sub-vector that forms the vector datum. Each vector datum has K bits. N and K are natural numbers. The vector data pre-accumulator 202 includes word lines 2021 that are arranged in parallel. The number of the word lines 2021 is K. All the word lines 2021 are coupled to the vector data arranger 201. The vector data pre-accumulator 202 is configured to store a second vector for computing the inner product of vectors. All the word lines 2021 are configured to receive each of the plurality of vector data. Each of the plurality of vector data enables the word line 2021. The enabled word line 2021 pre-accumulates the second vector to generate accumulation results R. The number converter 203 is coupled to the vector data pre-accumulator 202 and configured to receive, shift and add the accumulation results R corresponding to each of the plurality of vector data to obtain a total data value T in number format. The post-accumulator 204 is coupled to the number converter 203 and configured to receive, shift, and accumulate the total data values T corresponding to the plurality of vector data, thereby generating an inner product value P. For example, the number converter 203 may be a redundant to 2's complement (RTC) converter and the number format may be redundant to 2's complement format. The post-accumulator 204 may be configured to shift and accumulate the total data values T corresponding to the plurality of vector data based on an equation of $P=\Sigma_{j=0}^{N-1} T_j \cdot 2^j$, thereby generating the inner product value. P represents the inner product value, and $T_j$ represents the total data value T corresponding to a j-th vector datum of the plurality of vector data. Besides, the number converter 203 and the post-accumulator 204 may be integrated into a carry-save adder A, thereby reducing calculation delay and implementation cost.

In some embodiments of the present invention, the vector data pre-accumulator 202 may further include bit lines 2022 arranged in parallel and a memory array 2023. The memory array 2023 includes memory cells. The second vector includes data word vectors h1, h2, ..., and hk. For example, the vector data pre-accumulator 202 may be a computing-in-memory architecture. The number of the bit lines 2022 is M. Each of the word lines 2021 is coupled to all the bit lines 2022 through the memory cell. The memory cells respectively corresponding to the word lines 2021 are respectively configured to store the data word vectors h1, h2, ..., and hk. For example, the word lines 2021 from top to bottom are respectively used as a first word line, a second word line, ..., and a K-th word line. The memory cells coupled to the first word line are configured to store the data word vector h1. The memory cells coupled to the second word line are configured to store the data word vector h2. The memory cells coupled to the K-th word line are configured to store the data word vector hk. In the conventional technology, the memory array enables one word line one time. However, the vector data pre-accumulator 202 can enable the word lines 2021 one time. The vector data pre-accumulator 202 is configured to accumulate the data word vectors h1, h2, ..., and hk corresponding to all the bit lines 2022 corresponding to the enabled word line 2021, thereby generating all the accumulation results R respectively corresponding to all the bit lines 2022. In the first embodiment, the data word vectors h1, h2, ..., and hk include logic "0" or logic "1". The total number of the data word vectors h1, h2, ..., and hk is K. Each of the data word vectors h1, h2, ..., and hk has M bits. The total number of all the accumulation results R corresponding to each of the vector data is M. M is a natural number. Each accumulation result R has a length of $\log_2(K+1)$ bits. In an embodiment of the present invention, each of the accumulation results R generated by the vector data pre-accumulator 202 is the total number of a corresponding the logic "1", but the present invention is not limited thereto. As a result, the device for computing the inner product of vectors sense word lines 2021 and bit lines 2022 and implement a look-up table memory with the vector data pre-accumulator 202 and the number converter 203. The memory size of the vector data pre-accumulator 202 linearly increase with the length of the vector. Thus, the device for computing the inner product of vectors applies to computing an inner product of long vectors, greatly reduces computation amount, increases computation speed, and decreases power consumption.

Assume that N is equal to 3 and K is equal to 4. The vector data arranger 201 sequentially outputs the first vector datum, the second vector datum, and the third vector datum. When the vector data arranger 201 outputs the first vector datum, j is equal to 0. When the vector data arranger 201 outputs the second vector datum, j is equal to 1. When the vector data arranger 201 outputs the third vector datum, j is equal to 2. The accumulation results R may be the first accumulation results, the second accumulation results, or the third accumulation results.

When the first vector datum is [0001], the vector data pre-accumulator 202 receives the first vector datum and pre-accumulates the data word vectors h1, h2, h3, and h4 based on the first vector datum, thereby generating the first accumulation results. The first accumulation results are equivalent to h1. The number converter 203 receives, shifts, and adds the first accumulation results to obtain $T_0$. When the second vector datum is [0011], the vector data pre-accumulator 202 receives the second vector datum and pre-accumulates the data word vectors h1, h2, h3, and h4 based on the second vector datum, thereby generating the second accumulation results. The second accumulation results are equivalent to h1+h2. The number converter 203 receives, shifts, and adds the second accumulation results to obtain $T_1$. When the third vector datum is [1111], the vector data pre-accumulator 202 receives the third vector datum and pre-accumulates the data word vectors h1, h2, h3, and h4 based on the third vector datum, thereby generating the third accumulation results. The third accumulation results are equivalent to h1+h2+h3+h4. The number converter 203 receives, shifts, and adds the third accumulation results to obtain $T_2$. Finally, the post-accumulator 204 receives, shifts, and accumulates $T_0$, $T_1$, and $T_2$ to generate the inner product value P based on an equation of $P=\Sigma_{j=0}^{N-1} T_j \cdot 2^j$.

Figure 3:
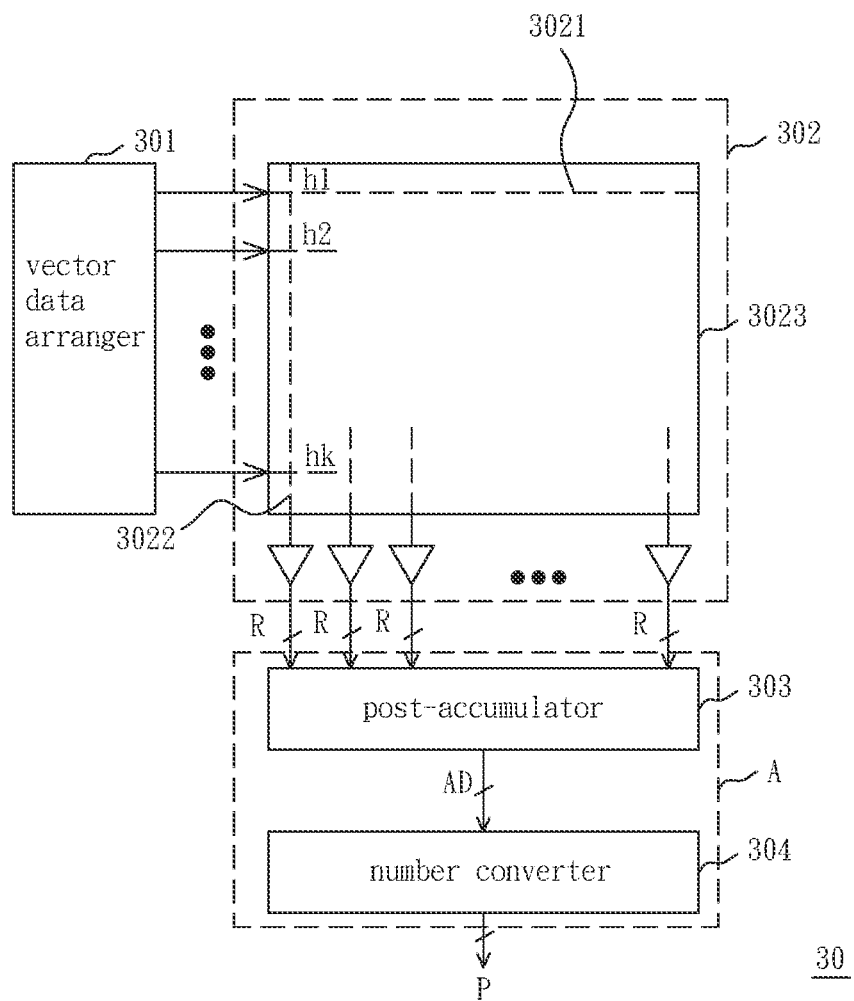
FIG. 3 is a schematic diagram illustrating a device for computing the inner product of vectors according to a second embodiment of the present invention.

FIG. 3 is a schematic diagram illustrating a device for computing the inner product of vectors according to a second embodiment of the present invention. Referring to FIG. 3, the second embodiment of the device for computing the inner product of vectors of the present invention is introduced as follows. The device 30 for computing the inner product of vectors includes a vector data arranger 301, a vector data pre-accumulator 302, a post-accumulator 303, and a number converter 304. The vector data arranger 301 is configured to store a first vector for computing the inner product of vectors. The first vector includes sub-vectors. The total number of the sub-vectors is K. Each sub-vector has N bits. The vector data arranger 301 is configured to sequentially output a plurality of vector data, wherein each of the plurality of vector data includes at least one identical bit or one identical byte of each of the sub-vectors. For example, the first vector includes three sub-vectors. Each sub-vector includes three bits or three bytes. The vector data arranger 201 is configured to sequentially output three vector data. Assume that the first sub-vector, the second sub-vector, and the third sub-vector are respectively [000], [010], and [100]. The first vector datum includes the first bit of each sub-vector, namely [000]. The second vector datum includes the second bit of each sub-vector, namely [010]. The third vector datum includes the third bit of each sub-vector, namely [001]. In the second embodiment, the total number of the vector data is N/B. B is the bit-width for selecting the same bit data of each sub-vector that forms the vector datum. Each vector datum has K bits. N and K are natural numbers.

The vector data pre-accumulator 302 includes word lines 3021 that are arranged in parallel. The number of the word lines 3021 is K. All the word lines 3021 are coupled to the vector data arranger 301. The vector data pre-accumulator 302 is configured to store a second vector for computing the inner product of vectors. All the word lines 3021 are configured to receive each of the plurality of vector data. Each of the plurality of vector data enables the word line 3021. The enabled word line 3021 pre-accumulates the second vector to generate accumulation results R. The post-accumulator 303 is coupled to the vector data pre-accumulator 302 and configured to receive, shift, and accumulate the accumulation results R corresponding to the plurality of vector data, thereby obtaining accumulation data values AD in redundant format. The number converter 304 is coupled to the post-accumulator 303 and configured to receive, shift, and add the accumulation data values AD, thereby obtaining an inner product value P in number format. For example, the number converter 304 is a redundant to 2's complement (RTC) converter and the number format is 2's complement format. The number converter 304 is configured to shift and add the accumulation data values AD based on an equation of $P=\Sigma_{j=0}^{N+M-2} AD_j \cdot 2^j$, thereby generating the inner product value P. $AD_j$ represents a j-th accumulation data value of the accumulation data values AD in redundant format, and M represents the total number of the accumulation results R corresponding to each of the plurality of vector data. Since the accumulation results R are accumulated in redundant format and then converted into a value in 2's complement format, the calculation speed and relative power consumption of the number converter 304 can be reduced, thereby increasing the operation speed of hardware. In addition, the number converter 304 and the post-accumulator 303 are integrated into a carry-save adder A, thereby reducing calculation delay and implementation cost.

In some embodiments of the present invention, the vector data pre-accumulator 302 may further include bit lines 3022 arranged in parallel and a memory array 3023. The memory array 3023 includes memory cells. The second vector includes data word vectors h1, h2, . . . , and hk. For example, the vector data pre-accumulator 302 may be a computing-in-memory architecture. The number of the bit lines 3022 is M. Each of the word lines 3021 is coupled to all the bit lines 3022 through the memory cell. The memory cells respectively corresponding to the word lines 3021 are respectively configured to store the data word vectors h1, h2, . . . , and hk. For example, the word lines 3021 from top to bottom are respectively used as a first word line, a second word line, . . . , and a K-th word line. The memory cells coupled to the first word line are configured to store the data word vector h1. The memory cells coupled to the second word line are configured to store the data word vector h2. The memory cells coupled to the K-th word line are configured to store the data word vector hk. In the conventional technology, the memory array enables one word line one time. Like the first embodiment, the vector data pre-accumulator 302 can enable the word lines 3021 one time. The vector data pre-accumulator 302 is configured to accumulate the data word vectors h1, h2, . . . , and hk corresponding to all the bit lines 3022 corresponding to the enabled word line 3021, thereby generating all the accumulation results R respectively corresponding to all the bit lines 3022. In the second embodiment, the data word vectors h1, h2, . . . , and hk include logic "0" or logic "1". The total number of the data word vectors h1, h2, . . . , and hk is K. Each of the data word vectors h1, h2, . . . , and hk has M bits. The total number of all the accumulation results R corresponding to each of the vector data is M. M is a natural number. Each accumulation result R has a length of $\log_2(K+1)$ bits. In an embodiment of the present invention, each of the accumulation results R generated by the vector data pre-accumulator 302 is the total number of a corresponding the logic "1", but the present invention is not limited thereto. As a result, the device for computing the inner product of vectors sense word lines 3021 and bit lines 3022 and implement a look-up table memory with the vector data pre-accumulator 302 and the number converter 304. The memory size of the vector data pre-accumulator 302 linearly increase with the length of the vector. Thus, the device for computing the inner product of vectors applies to computing an inner product of long vectors, greatly reduces computation amount, increases computation speed, and decreases power consumption.

Assume that N is equal to 3, K is equal to 4, and M is equal to 3. The vector data arranger 301 sequentially outputs the first vector datum, the second vector datum, and the third vector datum. Assume that h1 is [001], h2 is [010], h3 is [011], and h4 is [100].

When the first vector datum is [0001], the vector data pre-accumulator 302 receives the first vector datum and pre-accumulates the data word vectors h1, h2, h3, and h4 based on the first vector datum, thereby generating the first accumulation results R. The first accumulation results R are equivalent to h1. When the second vector datum is [0011], the vector data pre-accumulator 302 receives the second vector datum and pre-accumulates the data word vectors h1, h2, h3, and h4 based on the second vector datum, thereby generating the second accumulation results R. The second accumulation results R are equivalent to h1+h2, namely [011]. When the third vector datum is [1111], the vector data pre-accumulator 302 receives the third vector datum and pre-accumulates the data word vectors h1, h2, h3, and h4 based on the third vector datum, thereby generating the third accumulation results R. The third accumulation results R are equivalent to h1+h2+h3+h4, namely [022]. The post-accumulator 303 receives, shifts, and accumulates the first accumulation results R, the second accumulation results R, and the third accumulation results R to obtain total data values $AD_0, AD_1, AD_2, AD_3,$ and $AD_4$ in number format. As shown in formula (2), $AD_0$ is 1, $AD_1$ is 1, $AD_2$ is 3, $AD_3$ is 2, and $AD_4$ is 0. Finally, the number converter 304 shifts and adds the total data values $AD_0, AD_1, AD_2, AD_3,$ and $AD_4$ based on an equation of $P=\Sigma_{j=0}^{N+M-2} AD_j \cdot 2^j$, thereby generating the inner product value P.

$$[-001]+[-0110]+[02200]=[02311] \quad (2)$$

According to the embodiments provided above, the device for computing the inner product of vectors sense word lines and bit lines and implement a look-up table memory with the vector data pre-accumulator 202 and the number converter. The memory size of the vector data pre-accumulator linearly increase with the length of the vector. Thus, the device for computing the inner product of vectors applies to computing an inner product of long vectors, greatly reduces computation amount, increases computation speed, and decreases power consumption.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A device for computing an inner product of vectors comprising:
    a vector data arranger configured to store a first vector for computing the inner product of vectors, wherein the first vector includes sub-vectors, the vector data arranger is configured to sequentially output a plurality of vector data, and each of the plurality of vector data includes at least one identical bit of each of the sub-vectors;
    a vector data pre-accumulator including word lines that are arranged in parallel and coupled to the vector data arranger, wherein the vector data pre-accumulator is configured to store a second vector for computing the inner product of vectors, the word lines are configured to receive each of the plurality of vector data, each of the plurality of vector data enables the word line, and an enabled the word line pre-accumulates the second vector to generate accumulation results;
    a number converter coupled to the vector data pre-accumulator and configured to receive, shift and add the accumulation results corresponding to each of the plurality of vector data to obtain a total data value in number format; and
    a post-accumulator coupled to the number converter and configured to receive, shift, and accumulate the total data values corresponding to the plurality of vector data, thereby generating an inner product value;
    wherein the number converter is a redundant to 2's complement (RTC) converter and the number format is 2's complement format.

2. The device for computing the inner product of vectors according to claim 1, wherein the vector data pre-accumulator further comprises memory cells and bit lines arranged in parallel, the second vector includes data word vectors, each of the word lines is coupled to the bit lines through the memory cell, the memory cells respectively corresponding to the word lines are respectively configured to store the data word vectors, and the vector data pre-accumulator is configured to accumulate the data word vectors corresponding to the bit lines corresponding to an enabled the word line, thereby generating the accumulation results respectively corresponding to the bit lines.

3. The device for computing the inner product of vectors according to claim 1, wherein the post-accumulator is configured to shift and accumulate the total data values corresponding to the plurality of vector data based on an equation of $P=\Sigma_{j=0}^{N-1} T_j \cdot 2^j$, thereby generating the inner product value, P represents the inner product value, N represents total number of the plurality of vector data, and $T_j$ represents the total data value corresponding to a j-th vector datum of the plurality of vector data.

4. The device for computing the inner product of vectors according to claim 1, wherein the vector data pre-accumulator is a computing-in-memory architecture.

5. The device for computing the inner product of vectors according to claim 2, wherein the data word vectors include logic "1" or logic "0".

6. The device for computing the inner product of vectors according to claim 5, wherein each of the accumulation results generated by the vector data pre-accumulator is total number of a corresponding the logic "1".

7. The device for computing the inner product of vectors according to claim 1, wherein the number converter and the post-accumulator are integrated into a carry-save adder.

8. A device for computing an inner product of vectors comprising:

a vector data arranger configured to store a first vector for computing the inner product of vectors, wherein the first vector includes sub-vectors, the vector data arranger is configured to sequentially output a plurality of vector data, and each of the plurality of vector data includes at least one identical bit of each of the sub-vectors;

a vector data pre-accumulator including word lines that are arranged in parallel and coupled to the vector data arranger, wherein the vector data pre-accumulator is configured to store a second vector for computing the inner product of vectors, the word lines are configured to receive each of the plurality of vector data, each of the plurality of vector data enables the word line, and an enabled the word line pre-accumulates the second vector to generate accumulation results;

a post-accumulator coupled to the vector data pre-accumulator and configured to receive, shift, and accumulate the accumulation results corresponding to the plurality of vector data, thereby obtaining accumulation data values in redundant format; and a number converter coupled to the post-accumulator and configured to receive, shift, and add the accumulation data values, thereby obtaining an inner product value in number format.

9. The device for computing the inner product of vectors according to claim 8, wherein the vector data pre-accumulator further comprises memory cells and bit lines arranged in parallel, the second vector includes data word vectors, each of the word lines is coupled to the bit lines through the memory cell, the memory cells respectively corresponding to the word lines are respectively configured to store the data word vectors, and the vector data pre-accumulator is configured to accumulate the data word vectors corresponding to the bit lines corresponding to an enabled the word line, thereby generating the accumulation results respectively corresponding to the bit lines.

10. The device for computing the inner product of vectors according to claim 8, wherein the number converter is a redundant to 2's complement (RTC) converter and the number format is 2's complement format.

11. The device for computing the inner product of vectors according to claim 10, wherein the number converter is configured to shift and add the accumulation data values based on an equation of $P=\Sigma_{j=0}^{N+M-2} AD_j \cdot 2^j$, thereby generating the inner product value, P represents the inner product value, N represents total number of the plurality of vector data, $AD_j$ represents a j-th accumulation data value of the accumulation data values in redundant format, and M represents total number of the accumulation results corresponding to each of the plurality of vector data.

12. The device for computing the inner product of vectors according to claim 8, wherein the vector data pre-accumulator is a computing-in-memory architecture.

13. The device for computing the inner product of vectors according to claim 9, wherein the data word vectors include logic "1" or logic "0".

14. The device for computing the inner product of vectors according to claim 13, wherein each of the accumulation results generated by the vector data pre-accumulator is total number of a corresponding the logic "1".

15. The device for computing the inner product of vectors according to claim 8, wherein the number converter and the post-accumulator are integrated into a carry-save adder.

* * * * *